(12) United States Patent
Lattmann et al.

(10) Patent No.: US 9,185,038 B2
(45) Date of Patent: Nov. 10, 2015

(54) TECHNIQUE FOR CONTROLLING A LOAD STATE OF A PHYSICAL LINK CARRYING A PLURALITY OF VIRTUAL LINKS

(75) Inventors: Joël Lattmann, Champs sur Marne (FR); Mihaela Oprescu, Issy les Moulineaux (FR); Mickael Meulle, Paris (FR)

(73) Assignee: FRANCE TELECOM, Paris (FR)

( * ) Notice: Subject to any disclaimer, the term of this patent is extended or adjusted under 35 U.S.C. 154(b) by 291 days.

(21) Appl. No.: 13/512,257

(22) PCT Filed: Nov. 19, 2010

(86) PCT No.: PCT/FR2010/052458
§ 371 (c)(1),
(2), (4) Date: May 25, 2012

(87) PCT Pub. No.: WO2011/064488
PCT Pub. Date: Jun. 3, 2011

(65) Prior Publication Data
US 2012/0257496 A1    Oct. 11, 2012

(30) Foreign Application Priority Data
Nov. 27, 2009  (FR) ..................................... 09 58436

(51) Int. Cl.
*H04L 12/803* (2013.01)
*H04L 12/701* (2013.01)
(Continued)

(52) U.S. Cl.
CPC .............. *H04L 47/122* (2013.01); *H04L 45/00* (2013.01); *H04L 45/125* (2013.01); *H04L 47/10* (2013.01); *H04L 47/11* (2013.01)

(58) Field of Classification Search
CPC ....... H04L 45/125; H04L 47/10; H04L 47/11; H04L 47/122
See application file for complete search history.

(56) References Cited

U.S. PATENT DOCUMENTS 5,583,860 A * 12/1996 Iwakawa et al. .............. 370/232
6,219,337 B1 * 4/2001 Miyao ........................... 370/230
6,816,585 B1 * 11/2004 Blatt et al. ............... 379/221.03
(Continued)

FOREIGN PATENT DOCUMENTS

EP          2109336 A1    10/2009

OTHER PUBLICATIONS

Chai et al, "A Policy-Driven Network Management System for the Dynamic Configuration of Military Networks", 2009, AIMS 2009.*
(Continued)

*Primary Examiner* — Omer S Mian
(74) *Attorney, Agent, or Firm* — David D. Brush; Westman, Champlin & Koehler, P.A.

(57) ABSTRACT

A control method is provided for controlling a load state of a physical link between two physical network nodes in a physical network. A physical link carries a plurality of virtual links, and a virtual link connects together two virtual nodes belonging to a virtual network. First and second metrics are associated with the virtual link. The control method includes the following steps implemented by one of the two physical network nodes: a step of detecting a load state of a physical link; a step of identifying a virtual link for which a present metric is the first metric; and a step of sending a command to the virtual node carried by the physical node and to which the identified virtual link is connected, the command requesting a modification of the present metric from the first metric to the second metric for the virtual link.

9 Claims, 3 Drawing Sheets

(51) Int. Cl.
*H04L 12/729* (2013.01)
*H04L 12/801* (2013.01)

(56) References Cited

U.S. PATENT DOCUMENTS

| | | | | |
|---|---|---|---|---|
| 7,296,087 | B1 | 11/2007 | Ashwood Smith | |
| 7,859,993 | B1* | 12/2010 | Choudhury et al. | 370/217 |
| 8,477,597 | B2* | 7/2013 | Zhang et al. | 370/217 |
| 2006/0146696 | A1* | 7/2006 | Li et al. | 370/218 |
| 2006/0209785 | A1* | 9/2006 | Iovanna et al. | 370/351 |
| 2007/0201380 | A1* | 8/2007 | Ma et al. | 370/254 |
| 2008/0059556 | A1* | 3/2008 | Greenspan et al. | 709/201 |

OTHER PUBLICATIONS

International Preliminary Report on Patentability and English translation of the Written Opinion dated Jul. 4, 2012 for corresponding International Application No. PCT/FR2010/052458, filed Nov. 19, 2010.

English translation of the International Search Report dated Feb. 14, 2011 for corresponding International Application No. PCT/FR2010/052458, filed Nov. 19, 2010.

Written Opinion dated Feb. 14, 2011 for corresponding International Application No. PCT/FR2010/052458, filed Nov. 19, 2010.

Wei Koong Chai et al., "A Policy-Driven Network Management System for the Dynamic Configuration of Military Networks", Jun. 30, 2009, Scalability of Networks and Services, Springer Berlin Heidelberg, Berlin, Heidelberg, pp. 108-121, XP019122523.

Chai et al., "A Policy-Driven Network Management System for the Dynamic Configuration of Military Networks", R. Sadre and A. Pras (Eds.): AIMS 2009, LNCS 5637, pp. 108-121, 2009.IFIP International Federation for Information Processing 2009.

Ericsson et al., "A Genetic Algorithm for the Weight Setting Problem in OSPF Routing" Oct. 9, 2001.

Rexford et al., "Traffic Engineering with Traditional IP Routing Protocols" Topics in Internet Technology, IEEE Communications Magazine, Oct. 2002.

* cited by examiner

TECHNIQUE FOR CONTROLLING A LOAD STATE OF A PHYSICAL LINK CARRYING A PLURALITY OF VIRTUAL LINKS

CROSS-REFERENCE TO RELATED APPLICATIONS

This Application is a Section 371 National Stage Application of International Application No. PCT/FR2010/052458, filed Nov. 19, 2010, which is incorporated by reference in its entirety and published as WO 2011/064488 on Jun. 3, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure lies in the field of communications networks and it relates in particular to a technique for controlling a load state of a physical link between two physical network nodes carrying a plurality of virtual links.

BACKGROUND OF THE DISCLOSURE

Techniques exist nowadays for juxtaposing virtual pieces of equipment on a single piece of equipment. For this purpose, the operation of a virtual piece of equipment is simulated using software on the real equipment.

With the same logic, it is possible to create virtual networks $4_1, \ldots, 4_K$ on a given physical network 2, such as that shown in FIG. 1. A link of the physical network 2 may thus carry a plurality of virtual links, a virtual link connecting together two virtual pieces of equipment belonging to the same virtual network.

A virtual network architecture comprises superposing different logical topologies established between virtual pieces of equipment, these virtual topologies being supported by the architecture of the physical network 2.

In the context of increasing offers of service on communications networks, it is becoming less and less possible to envisage allowing all of the data streams using a physical network to travel over identical shortest paths as defined by a protocol such as the interior gateway protocol (IGP). Virtualization thus makes it possible to separate traffic between different types of supported services, by giving them appropriate topologies and quality of service characteristics. As a function of the services it is to support, each of the virtual networks complies with particular constraints, e.g. in terms of quality of service, transit time, or availability. By way of example, such an organization makes it possible to allocate a differentiated service to each of the virtual networks, such as:

- a "Voice over IP" service that imposes constraints in terms of end-to-end transit time;
- a video on demand service that imposes constraints in terms of data rate and availability;
- a service of routing business traffic, that imposes an availability constraint;
- a service of routing inter-bank traffic, that imposes security constraints; and
- a traffic routing service of the "best effort" type that must not disturb traffic with a guaranteed quality of service.

In such a model, the topologies of first virtual networks requiring a high quality of service are created on the highest-performance physical paths while those of second virtual networks requiring "best effort" type quality of service are established on physical paths that are little used, a priori. The distribution of the virtual networks as a function of classes of service thus makes it possible to optimize the occupation rates of the physical links.

The data belonging to the various virtual networks is subsequently multiplexed over the physical links. The packets thus pass via the physical interfaces of the physical equipment, where they might potentially give rise to congestion.

Because of this virtual network architecture, a failure of or congestion on a physical link runs the risk of affecting a plurality of virtual links making use of this physical link. The article by Wei Koong Chai et al. entitled: "A policy-driven network management system for the dynamic configuration of military networks" published in the Proceedings of the AIMS 2009 Conference, proposes a method comprising a dynamic allocation of topology per class of service coupled with quality service management between the virtual networks. Implementing such a method involves solving a set of linear equations for minimizing a cost criterion. That gives rise to a large calculation load that should preferably be executed in real time in order to determine metrics associated with the virtual links. That method is also implemented in the event of a physical link failing or becoming congested. Nevertheless, such a method is not suitable for implementing on physical networks of large size, because of the complexity of the calculations.

SUMMARY

In a first aspect, an embodiment of the invention provides a control method for controlling a load state of a physical link between two physical network nodes in a physical network, a physical link carrying a plurality of virtual links, a virtual link connecting together two virtual nodes belonging to a virtual network, first and second metrics being associated with said virtual link, said control method comprising the following steps implemented by one of the two physical network nodes:

a step of detecting a load state of a physical link;
a step of identifying a virtual link for which a present metric is the first metric; and
a step of sending a command to the virtual node carried by the physical node and to which the identified virtual link is connected, said command requesting a modification of the present metric from the first metric to the second metric for said virtual link.

When the load state is an overloaded state, the load control method seeks to reduce the amount of traffic using the physical link by modifying a metric, also known as a "weight", of a virtual link from a nominal value to a high value. The virtual networks are assumed to be at least 2-connected, i.e. it is assumed that there does not exist any link or node that would split the network into two non-connected portions if it were disconnected, so it is always certain that for each of the paths of a virtual network passing over a physical link there always exists at least one other path that does not pass via that link. Increasing the metric gives rise to a change in all or some of the shortest paths of the virtual network in question that pass via the physical link in question. The new paths are calculated, e.g. by implementing a routing protocol of the IGP type in the virtual network in question. This leads to updating a routing table of the virtual node in question and enables the overloaded physical link to be off-loaded in part, once the virtual network has achieved convergence. When the load state is an underloaded state, the control method seeks to reestablish nominal operating conditions by causing a virtual link metric that has been modified to return to its nominal value.

It is emphasized at this point that the load control method is entirely independent, with each physical node of the physical network taking the decision to modify the metrics of the virtual network links that it supports. Once a physical link is found to be in a clogged situation, it avoids determining metric modifications to be made by taking account of the overall context of the physical and virtual networks at the moment clogging of the link is detected. It is also possible to implement the method regardless of the number of physical and virtual nodes, unlike in the above-mentioned prior art.

The allocation of metrics to each of the links of a virtual network is thus considered as being optimal. The object of the method is thus not to provide long-term balancing of loads on the physical network, but to mitigate abnormal and temporary increases in local data rates compared with the expected nominal rate, and then to return to the initial situation once clogging is over.

Implementing the control method consists in increasing one by one the metrics of the virtual links supported by the physical link that is becoming saturated, until the physical link returns to a nominal state or to an underloaded state. It is emphasized at this point that this type of solution has been envisaged for a conventional communications network, i.e. a network that is not virtual, and that the prior art shows that the drawbacks are too great compared with the advantages. A first drawback consists in temporary routing loops being created that are likely to appear during the stage while the network is converging: it is then possible to have a traffic peak locally in the loop, thereby giving rise to packets being lost without distinction of belonging to any particular service. A second drawback consists in saturation propagating to other links as a result of changes to the shortest paths, which can thus give rise to a cascade or bounce effect. The article by B. Fortz et al. entitled "Traffic engineering with traditional IP routing protocols" published in the IEEE Communications Magazine, October 2002, thus sets aside this possibility of local modification to a metric of a congested link.

In order to avoid an instability phenomenon on the physical network, the metric is modified on a single virtual network at a time. As a result, although there is only one metric modification per virtual link, the response to the problem of overloading takes place progressively with the following advantages:

limiting the cascade and bounce phenomenon to the sole virtual network that is involved, since the metric increase is restricted to a single virtual network at a time; and causing the data flows to change progressively towards other paths as modifications take place on the successive virtual networks.

Furthermore, the diversity of the topologies of the various virtual networks that are supported enables the load to be better shared over the physical link. As a result, the recalculated shortest paths over the various topologies are better shared over the physical links.

According to another particular characteristic, the control method further comprises, for a packet for routing over the physical link from a virtual node, a step of queuing said packet as a function of a priority associated with the virtual network, the packets of the queues being sent as a function of said priorities.

It is emphasized here that the load control method remains independent, each physical node of the physical network implementing a packet-deleting policy as a function of priorities associated with the respective virtual networks. Under such circumstances, packets belonging to high-priority virtual networks are given priority.

According to another particular characteristic of the control method, the steps of queuing and sending as a function of priority are implemented when the detected load state is an overloaded state.

In the event of a physical link that supports high priority virtual networks becoming overloaded, the links used by by-pass paths do not run the risk of being saturated even if they are occupied by traffic of the "best effort" type, firstly because the metrics of the virtual networks are not affected, and secondly because the saturation, if any, is managed by the queuing mechanism, with packets from non-priority virtual networks being rejected, where appropriate.

According to another particular characteristic of the control method, the step of detecting a load state comprises measuring the mean traffic carried by the physical link.

According to another particular characteristic of the control method, the virtual links carried by the physical link are classified in a list in a priority order, and the virtual link is identified with the help of an index in the list.

The values of the metrics of virtual links supported by a physical link that is becoming clogged are thus modified by successive virtual networks in an order of increasing virtual link priority.

This leads to a convergence stage on the virtual networks of lower priority, e.g. networks conveying traffic in "best effort" mode, without penalizing networks of higher priority, e.g. networks having guaranteed quality of service.

In a second aspect, an embodiment of the invention also provides a control entity for controlling a load state of a physical link between two physical network nodes of a physical network, a physical link carrying a plurality of virtual links, a virtual link connecting together two virtual nodes belonging to a virtual network, first and second metrics being associated with said virtual link, said control entity comprising:

means for detecting a load state of the physical link;
means for identifying a virtual link for which a present metric is the first metric; and
means for sending a command to the virtual node carried by the physical node and to which the identified virtual link is connected, said command requesting a modification of the present metric from the first metric to the second metric for said virtual link.

In a third aspect, an embodiment of the invention also provides a physical node comprising a control entity for controlling a load state according to the second aspect, and another entity, the other entity comprising a routing module arranged to implement virtual node functions, and a reception module arranged to receive a command for modifying a present metric from a first metric to a second metric for a virtual link.

In a fourth aspect, an embodiment of the invention also provides a communications system having a plurality of physical nodes according to the third aspect.

In a fifth aspect, an embodiment of the invention also provides a computer program including instructions for implementing the control method for controlling a load state according to the first aspect by a control entity for controlling a load state when the program is executed by a processor.

In a sixth aspect, an embodiment of the invention also provides a computer program comprising instructions for implementing virtual node functions and for receiving a command to modify a present metric from a first metric to a second metric for a virtual link by a virtual node, when the program is executed by a processor.

BRIEF DESCRIPTION OF THE DRAWINGS

One or more embodiments of the invention can be better understood from the following description of a particular implementation of the method, given with reference to the accompanying drawings, in which.

DETAILED DESCRIPTION OF ILLUSTRATIVE EMBODIMENTS

Figure 1:
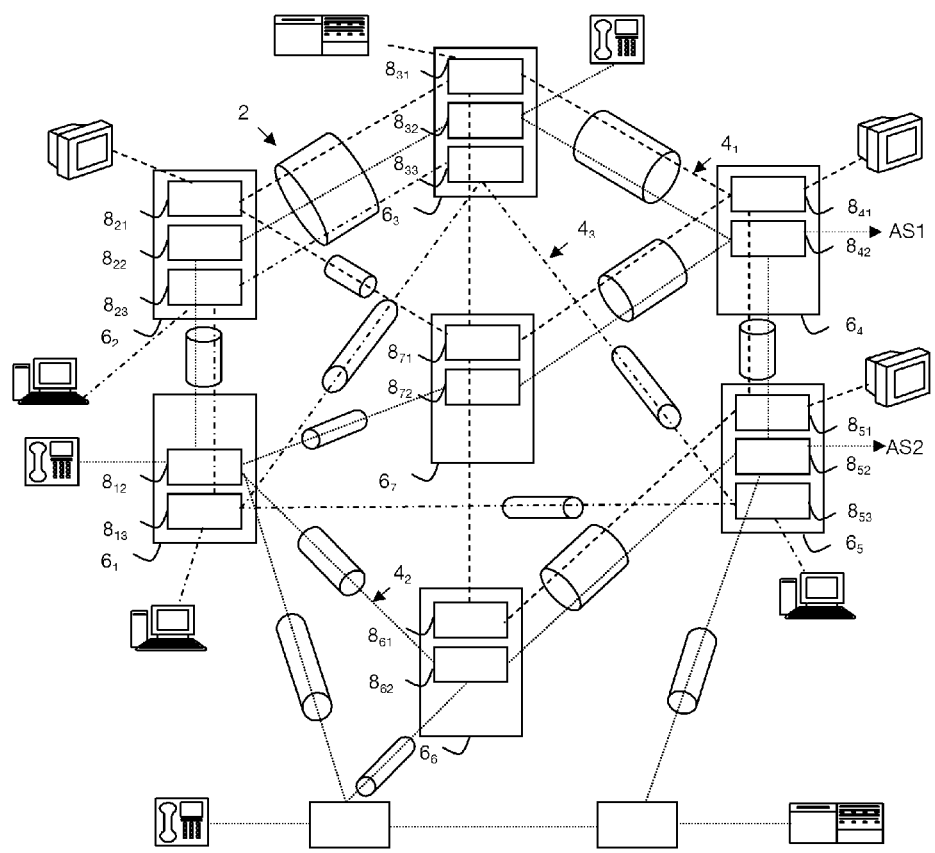
FIG. 1 shows an architecture for a physical network supporting a plurality of virtual networks.

FIG. 1 shows an architecture for a physical network 2 in a configuration having K virtual networks on N physical network nodes. More precisely, this configuration is represented in the special case of three virtual networks carried by the physical network 2 that has seven real nodes. Naturally, this is merely an illustrative and non-limiting example. A plurality of virtual routers or nodes are implemented in a single physical node and they are interconnected by means of the physical network architecture. Setting up a virtual network on a physical network architecture comprises superposing different logical topologies between the virtual routers. Each of the virtual networks behaves like a complete network on which it is possible to implement routing protocols and services. The virtual networks may be connected with other networks or autonomous systems AS. For a network to be resilient, its network topology must be at least 2-connected, i.e. there must not exist any link or node that, on being disconnected, would split the network into two non-connected portions. Thus, there exist at least two different paths between any pair of nodes in the network. A more general condition needed for network resilience is represented by the fact that a single failure does not degrade the service supported by the network. It is not always possible to achieve this condition in real networks because of the possibility that there will be load peaks that are difficult to take into account when calculating the dimensions of the network. In contrast, whether a network is 2-connected or more generally n-connected, is something that is determined by applying design rules when implementing the network.

It is assumed below that the virtual networks created on the physical networks are at least 2-connected concerning failures of virtual nodes or physical nodes.

The seven real nodes or physical network nodes are referenced $6_1$ to $6_7$, and they are connected together by links of the physical network 2, while supporting three virtual networks $4_1$ to $4_3$. Virtual nodes referenced $8_{ij}$ are configured in the real nodes. More precisely, the physical node $6_2$ has three virtual nodes $8_{21}$, $8_{22}$, and $8_{23}$ configured thereon. The virtual nodes $8_{i1}$, more precisely the virtual nodes $8_{21}$, $8_{31}$, $8_{41}$, $8_{51}$, $8_{61}$, and $8_{71}$ belong to the virtual network $4_1$ and they are connected together by virtual links that are represented by dashed lines. The virtual nodes $8_{i2}$, more precisely the virtual nodes $8_{12}$, $8_{22}$, $8_{32}$, $8_{42}$, $8_{52}$, $8_{62}$, and $8_{72}$ belong to the virtual network $4_2$ and they are connected together by virtual links that are represented by dotted lines. The virtual nodes $8_{i3}$, and more particularly the virtual nodes $8_{13}$, $8_{23}$, $8_{33}$, and $8_{53}$ belong to the virtual network $4_3$ and they are connected together by virtual links, represented by chain-dotted lines (dot-dashed lines). The virtual nodes or routers $8_{ij}$ implement packet routing functions in their respective virtual networks. For this purpose, each virtual node manages a routing table for its virtual network.

According to an embodiment of the invention, a network priority is associated with a virtual network. The network priority depends on the type of traffic supported. As a result, a plurality of virtual networks may have identical network priorities. In known manner, the network routes both traffic for which the loss of packets may be damaging and requiring a guaranteed quality of service, and also so-called "elastic" traffic that is regulated by its source and that can, to a certain extent, accommodate the loss of packets. The way in which priority is allocated does not form part of the method, but by way of example it may depend on the fact that the traffic being conveyed is more or less sensitive to packet loss. Other criteria may be involved such as service-guarantee contracts that have been taken out between the operator of the virtual network and its clients. By way of example, this makes it possible to associate a high priority with a first virtual network that supports a service of the "Voice over IP" type, a medium priority to a second virtual network that supports a service of the "video on demand" type, and a low priority to a third virtual network that supports a traffic routing service of the "best effort" type.

Still according to an embodiment of the invention, two distinct metrics are associated with a virtual link of a virtual network. A first or "nominal" metric $W_L$ corresponds to a metric associated with a link when the underlying physical link is in a first load state, known as a "nominal" state. A second or "high" metric $W_H$ corresponds to a metric associated with the link when the underlying physical link is in a second load state known as an "overloaded" state.

The algorithms for calculating and optimizing metrics in a network as a function of forecasts or real traffic matrices form part of the state of the art, and they are described for example in the article by M. Ericsson et al. entitled "A genetic algorithm for the weight-setting problem in OSPF routing", published in October 2001.

In a particular implementation, the virtual links carried by an underlying physical link are ordered in a predetermined order, referred to as the virtual link priority order. For example, the virtual links are classified in the order opposite to their contribution to the traffic routed by the underlying physical link.

It is emphasized here that the network priorities and the virtual links are not the same and that they have different functions. For a set of virtual networks of given identical network priority, priorities are set relating to the links of the virtual networks relative to one another. The priority of a virtual link is thus defined by a network priority and by a rank within the network priority.

Below, the notation $LV[\ ]=[L_1, L_2, \ldots, L_N]$ represents a table of descriptors of N virtual links supported by the physical link, ordered in order of increasing priority.

The descriptor of the virtual link $L=LV[p]$ is made up of three fields:

L.k, for k varying from one to K: rank of the virtual network in the set V of virtual networks;

L.M1: nominal metric of a virtual link, or $W_L$; and

L.M2: high metric of the virtual link or $W_H$.

Figure 2:
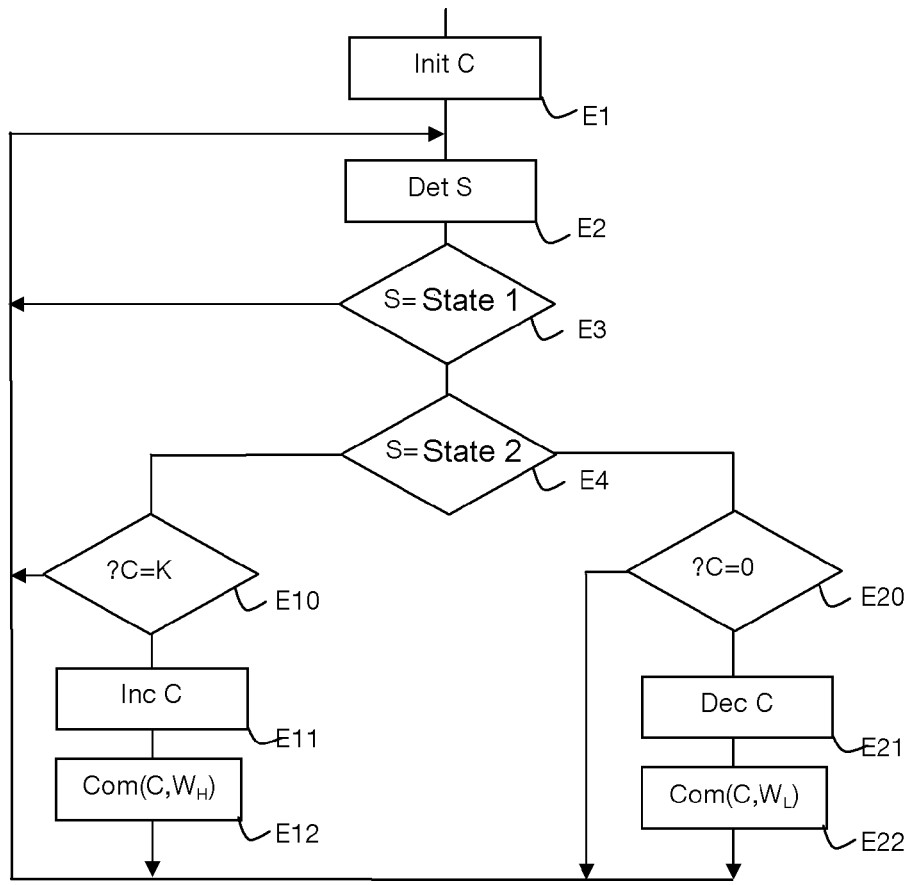
FIG. 2 shows some of the steps of the control method in a particular implementation of the invention.

The control method, as implemented by a physical node $6_i$ is described below with reference to FIG. 2.

In an initial step E1, a counter C is initialized to the value zero.

In a step E2 of determining a load state, the physical node $6_i$ performs a measurement D(t) of the traffic conveyed by the physical link L.

The physical link L is in the nominal state when the measurement of the traffic using the link lies between first and second thresholds thresh_max and thresh_min. The physical link L is in the overloaded state when the measurement of the traffic using the link is greater than the first threshold thresh_max. The physical link is in an underloaded state when the measurement of the traffic using the link is below the second threshold thresh_min.

Traffic may be measured using various known methods, such as measuring the mean data rate D(t) over a moving time interval of duration T that is much greater than a value Tc, corresponding to a convergence time of the network. The term "convergence time of the network" is used to mean the time needed for the routers to synchronize their respective routing tables after a change in the topology of the network.

In a step E3, the physical node $6_i$ verifies whether the load state of the link is the normal state. If it is, the method returns to step E2 of determining the state of the link.

Otherwise, i.e. if the load state of the physical link L is not the nominal state then the physical node $6_i$ verifies in a step E4 whether the load state is the overloaded state.

If the load state of the physical link L is the overloaded state, the physical node $6_i$ acts during a step E10 to verify whether the counter C has reached the value K. If it has, the respective metrics of the virtual link carried by the underlying physical link L have already been modified towards their respective high values. The control method can then no longer take any action and it returns to step E2 of detecting the load state.

If the counter C has not reached the value K, there then exists at least one virtual link for which the associated metric has not been modified towards its high value. In a step E11, the physical node $6_i$ increments the value of the counter C by one. The counter C corresponds to the rank of the virtual network to be processed. In a step E12, the physical node $6_i$ causes the virtual node $8_{ic}$ to modify the metric associated with the virtual link towards the high value L.M2 or $W_H$.

This metric modification on the virtual link triggers a convergence stage in the virtual network, during which stage the various virtual nodes update their respective routing tables as a function of the determined shortest paths.

It is emphasized here that only one virtual link is modified, in order to avoid triggering simultaneous convergence stages on the various virtual networks. The convergence stage that is triggered thus serves to redistribute, where appropriate, a portion of the traffic of the virtual network onto other physical links.

If routing loops should appear, they are thus limited to only one virtual network at a time, and to a subset of the global low priority traffic.

Bounce and cascade effects are liable to appear, but in the same manner they disturb only the networks of lower priority and they are also attenuated by the fact that the modification stepsize of the metrics is unique. This uniqueness limits successive shortest path exchanges passing via links that become overloaded in turn.

Consequently, implementing the method does not lead to overall disturbance of packet transfers over the physical network, and disturbances are restricted to the low priority networks that essentially support traffic of the "best effort" type.

Whenever a metric modification has been performed, it is also advantageous to implement the step E2 of determining a load state once again after a period has elapsed that is longer than the convergence time of the network, in order to leave the virtual network sufficient time to reach a stable state. The control method then passes back to the step E2 of determining a load state.

If the load state of the physical link L is the underloaded state, the physical node $6_i$ acts during a step E20 to verify whether the counter C has reached the value zero. If it has, then the respective metrics of the virtual link carried by the underlying physical link L are at their respective nominal values. The control method can then not take any action and it returns to the step E2 of determining the load state.

If the counter C has not reached the value zero, then there exists at least one virtual link for which the associated metric has been modified towards its high value. In a step E21, the physical node $6_i$ decrements the value of the counter C by one. In a step E22, the physical node $6_i$ causes the virtual node $8_{ic}$ to modify the metric associated with the virtual link towards the low value L.M1 or $W_L$. This metric modification has the same consequences as those described for step E12. The control method then returns to step E2 of determining a load state, possibly after waiting for a period longer than the convergence time of the network.

The steps E1 to E22 of the control method trigger actions that are implemented in a control plan for the virtual network.

Figure 3:
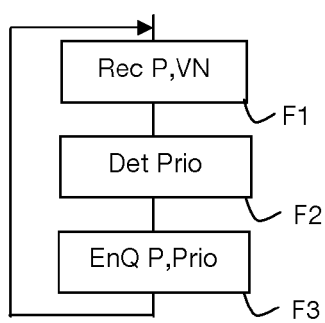
FIG. 3 shows other steps of the control method in a particular implementation of the invention.

In parallel, the control method takes actions in a transfer plan of the physical network. More precisely, for a packet for routing in the physical network, the physical node $6_i$ implements steps F1 to F3 of the control method. These steps F1 to F3 are described with reference to FIG. 3.

By way of example, the purpose of these steps is to implement management of the queues of the physical node $6_i$ based on a classification of the virtual networks analogous to a classification of the DiffServ type. It is recalled that DiffServ requires IP packets entering the network to be classified and marked as belonging to a given class of service. Differentiated processing as a function of different classes of traffic is then applied. In an embodiment of the invention, the above-defined priority of the virtual network is used to determine the class of service to which it belongs.

During step F1, the physical node $6_i$ receives from the virtual network $4_j$ a packet P for routing over the physical link L. During step F2, the physical node $6_i$ obtains the priority of the virtual network $4_j$. During step F3, the physical node $6_i$ queues the packet P as a function of the virtual network priority it has obtained. The packets present in the queues are sent out using techniques that are known in the prior art such as methods of the random early detection (RED) type or of the "round robin" type, or of the "weighted fair queuing" type, etc. Packet queuing is found to be simpler to implement than in conventional networks, in particular those managed by the DiffServ method, since the packets are differentiated solely as a function of the criterion of belonging to a given virtual network. The physical node $6_i$ has already determined this criterion during the operations of multiplexing/demultiplexing data going to or coming from the virtual networks.

In a first variant, during the step E12, i.e. when the load state of the physical link L corresponds to an overloaded state, the physical node $6_i$ triggers the implementation of steps F1 to F3 of the control method in the transfer plan. In addition, during step E22, i.e. when the load state of the physical link is an underloaded state, the physical node $6_i$ stops implementing the steps F1 to F3 of the control method in the transfer plan. Consequently, when the load state corresponds to a nominal state, then steps F1 to F3 of the control method are not implemented. Under such circumstances, so long as the load state of the physical link L is a nominal load state, i.e. so long as the passband of the physical link L is available, the packets P are routed without discrimination, i.e. in "best effort" mode. As soon as the load state of the physical link L changes to an overloaded state, discrimination is implemented in the routing of packets as a function of the virtual network to which they belong.

In a second variant, the physical node $6_i$ does not implement the steps F1 to F3 of the control method. Under such circumstances, the control method makes it possible to obtain the advantages mentioned above with reference to steps E1 to E22.

The high and nominal metric values of the metrics associated with the virtual links are likely to vary over time as a function of load conditions of the links. These parameters are preferably accessible via an administration interface of the physical node $6_i$.

The priority order of the virtual links specific to each physical link may also vary as a function of statistical profiles setting out the load distribution of the virtual networks over time. A third variant consists in calculating the priority level from a local measurement in real time of the loads of the virtual links.

An illustrative example of how some of the steps of the control method are implemented by a physical node is described in detail below with reference to FIGS. 4a and 4b. A virtual network VN is supported by physical links that are represented by continuous lines in FIGS. 4a and 4b. In order to avoid overcomplicating these FIGS. 4a and 4b, only one virtual network is described and shown. It should naturally be understood that other virtual networks can use the above-mentioned physical links. Since the control method is implemented for a single virtual network by iteration, there is no point in describing the other virtual networks. These physical links connect together physical nodes A-J. More precisely, the physical node A is connected to physical nodes B and E. The physical node B is connected to physical nodes A and C. The physical node C is connected to physical nodes B and D. The physical node E is connected to physical nodes A, G, and F. The physical node F is connected to physical nodes E, D, and J. The physical node D is connected to physical nodes C and F. The physical node G is connected to physical nodes E and H. The physical node H is connected to physical nodes G and I. The physical node I is connected to physical nodes H and J. The physical node J is connected to physical nodes F and I. The virtual links of the virtual network VN, i.e. AB, BC, CD, AE, EF, FD, GE, FJ, GH, HI, and IJ are respectively associated with metrics having the following values: 2, 3, 3, 2, 2, 3, 2, 2, 2, 3, 2, represented in FIG. 4a in the form "W=".

Figure 4A:
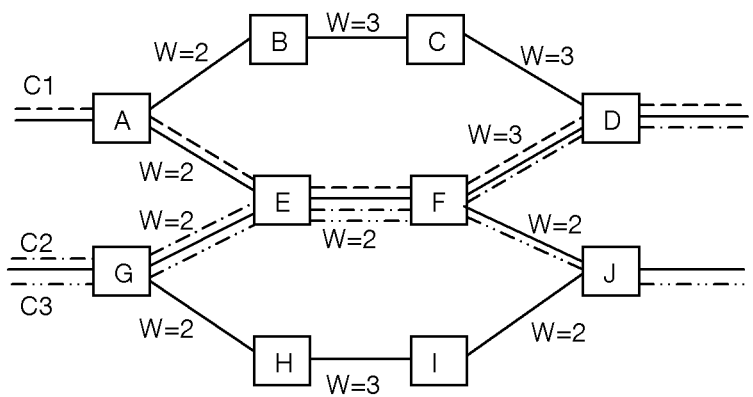
FIGS. 4a and 4b show the effect of performing steps of the control method in a particular implementation of the invention.
Figure 4B:
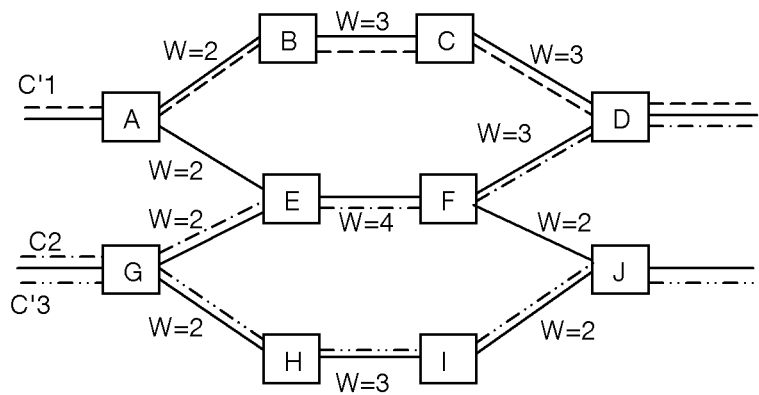

In a nominal state, as shown in FIG. 4a, three paths C1, C2, and C3 are conveyed by the physical link EF. The first path C1, drawn in dashed lines is carried by the physical links AEFD and is associated with a metric of value 7. The second path C2, drawn with chain-dotted lines is carried by the physical link GEFD and is associated with a metric of value 7. A third path C3, drawn with lines made up of dashes and pairs of dots, is carried by the physical links GEFJ and is associated with a metric of value 6.

In step E4 of the control method, the physical node E detects that the physical link EF has reached a first threshold and runs the risk of saturating. In step E12 of the control method, the physical node E causes the metric associated with the virtual link carried by the underlying physical link EF to be changed from the nominal volume of two to a high value of four. FIG. 4b shows the state of the FIG. 4a network after this metric modification. A better path between the physical nodes A and D now passes via the physical nodes B and C. This new first path is referenced C'1 and is associated with a metric of value eight. The best path between the physical nodes G and J now passes through the physical nodes H and I. This new third path is written C'3 and is associated with a metric of value seven. The second path C2 between the physical nodes G and D remains one of the shortest paths passing via the physical nodes E and F and is associated with a metric of value nine.

It can be seen with the help of this illustrative example that modifying the metric on the physical link EF with the help of the control method of an embodiment of the invention serves to cause shortest paths through the virtual network VN to be determined once more, thereby taking load off the physical link EF. If the physical link EF continues to remain above the first threshold, the physical node E will then implement the steps of the control method once more for another one of the virtual networks conveyed by the physical link EF.

A control entity for controlling a load state is described below with reference to FIG. 5.

Such a control entity 100 for controlling a load state comprises:
- a module 101 for detecting a load state of the physical link;
- a module 102 for identifying a virtual link for which a present metric is the first metric;
- a module 103 for sending a command to the virtual node carried by the physical node and to which the identified virtual link is connected, said command requesting a modification of the present metric from the first metric to the second metric for said virtual link; and
- a multiplexer and demultiplexer module 104 for acting on packets coming from or going to virtual nodes and for routing over the physical link.

The multiplexer/demultiplexer module 104 may also be arranged to queue the packets as a function of a priority associated with the virtual networks to which they belong and to multiplex the stored packets in the queues.

Figures 5, 6:
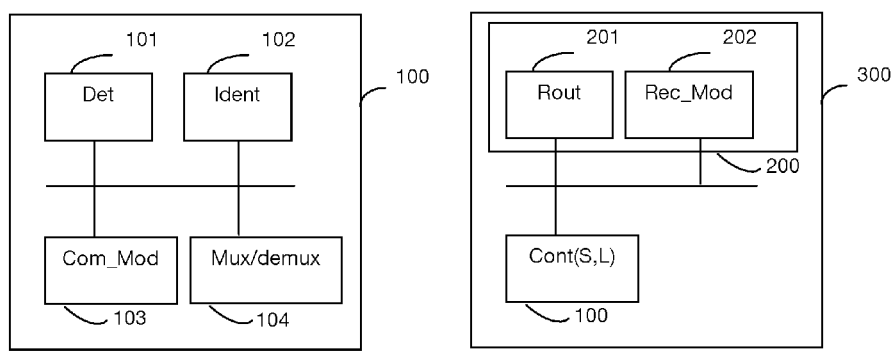
FIG. 5 shows a control entity for controlling a load state in a particular embodiment of the invention.
FIG. 6 shows a physical node in a particular embodiment of the invention.

The entity 100 for controlling a load state as described above is designed to be incorporated in a physical node 300, as shown in FIG. 6. The physical node 300 also has one or more virtual nodes 200. The virtual node 200 comprises a routing module 201 arranged to implement virtual node functions, and a reception module 202 arranged to receive a command to modify a present metric from the first metric to the second metric for a virtual link. The module 202 then sends the new metric to the module 201 for application to the virtual link in question. The modules 201 and 202 of the virtual node are preferably software modules comprising software instructions for routing packets in a virtual network and for receiving a command to modify the present metric.

The modules 101, 102, and 103 of a control entity for controlling a load state 100 are arranged to implement the steps of the method for controlling a load state as described above when executed by the control entity. They are preferably software modules comprising software instructions for executing those steps of the above-described method for controlling a load state that are implemented by an entity. An embodiment of the invention thus also provides:
- a program for a control entity for controlling a load state, the program comprising program instructions for controlling the execution of steps of the above-described control method that are executed by said entity, when said program is executed by a processor thereof; and a recording medium readable by a control entity for controlling a load state, and on which the program for a control entity is recorded.

The software modules may be stored in or transmitted by a data medium. The medium may be a hardware storage medium, e.g. a compact disk read-only memory (CD-ROM), a floppy disk or a hard disk, or indeed a transmission medium such as an electrical, optical, or radio signal, or a telecommunications network.

Although the present disclosure has been described with reference to one or more examples, workers skilled in the art will recognize that changes may be made in form and detail without departing from the scope of the disclosure and/or the appended claims.

The invention claimed is:

1. A control method for controlling a load state of a physical link between two physical network nodes in a physical network comprising a plurality of physical links, the physical link carrying a plurality of virtual links, each virtual link connecting together two virtual nodes belonging to a virtual network, said control method comprising the following acts implemented by one of the two physical network nodes for each physical link of the physical network:
    setting a counter to a counter value, a first metric to a first value and a second metric to a second value higher than the first value;
    detecting a load state of the physical link connected to the physical node;
    determining, in response to the load state being an overload state, that the counter value has not reached a maximum value;
    identifying, in response to said determining, a single virtual link carried by the physical link for which a current metric is equal to the first metric, wherein said determining indicates the current metric is not already modified; and
    incrementing the counter and sending a command to the virtual node carried by the physical node and to which the identified virtual link is connected, said command requesting a modification of the current metric from the first metric to the second metric for said virtual link in order to trigger a convergence state where data traffic is diverted away from said physical link in said overload state.

2. The control method according to claim 1, further comprising:
    for a packet for routing over the physical link from one of the virtual nodes, queuing said packet in a queue as a function of a priority associated with the virtual network, the packets of the queue being sent as a function of said priority.

3. The control method according to claim 2, wherein the acts of queuing and sending as a function of priority are implemented when the detected load state is the overload state.

4. The control method according to claim 1, wherein the act of detecting a load state comprises measuring the mean traffic carried by the physical link.

5. The control method according to claim 1, wherein the virtual links carried by the physical link are classified in a list in a priority order, and the virtual link is identified with the help of an index in the list.

6. A control entity implemented on a physical node for controlling a load state of a physical link between the physical node and a second physical network node of a physical network comprising a plurality of physical links, the physical link carrying a plurality of virtual links, each virtual link connecting together two virtual nodes belonging to a virtual network, said control entity comprising:
    a processor configured by instructions to perform the following for each physical link of the physical network:
    set a counter to a counter value, a first metric to a first value and a second metric to a second value higher than the first value;
    detect a load state of the physical link connected to the physical node;
    determine, in response to the load state being an overload state, that the counter value has not reached a maximum value;
    identify, in response to said determining, a single virtual link carried by the physical link for which a current metric is equal to the first metric, wherein said determining indicates the current metric is not already modified; and
    increment the counter and send a command to the virtual node carried by the physical node and to which the identified virtual link is connected, said command requesting a modification of the current metric from the first metric to the second metric for said virtual link in order to trigger a convergence state where data traffic is diverted away from said physical link in said overload state.

7. A physical node comprising a control entity for controlling a load state according to claim 6, and another entity, the other entity comprising a routing module arranged to implement virtual node functions, and a reception module arranged to receive the command for modifying the current metric from the first metric to the second metric for said virtual link.

8. A communications system comprising a plurality of physical nodes according to claim 7.

9. A non-transitory computer-readable hardware storage medium comprising a computer program stored thereon and including instructions for implementing a control method for controlling a load state of a physical link between two physical network nodes in a physical network comprising a plurality of physical links, when the program is executed by a processor, the physical link carrying a plurality of virtual links, each virtual link connecting together two virtual nodes belonging to a virtual network, said control method comprising the following acts implemented by one of the two physical network nodes for each physical link of the physical network:
    setting a counter to a counter value, a first metric to a first value and a second metric to a second value higher than the first value;
    detecting a load state of the physical link connected to the physical node;
    determining, in response to the load state being an overload state, that the counter value has not reached a maximum value;
    identifying, in response to said determining, a single virtual link carried by the physical link for which a current metric is equal to the first metric, wherein said determining indicates the current metric is not already modified; and
    incrementing the counter and sending a command to the virtual node carried by the physical node and to which the identified virtual link is connected, said command requesting a modification of the current metric from the first metric to the second metric for said virtual link in order to trigger a convergence state where data traffic is diverted away from said physical link in said overload state.

* * * * *